United States Patent
Yamauchi

(10) Patent No.: US 10,187,174 B2
(45) Date of Patent: *Jan. 22, 2019

(54) OPTICAL RECEPTION APPARATUS AND MONITOR SIGNAL GENERATING METHOD

(71) Applicant: NEC Corporation, Tokyo (JP)

(72) Inventor: Yusuke Yamauchi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/601,103

(22) Filed: May 22, 2017

(65) Prior Publication Data

US 2017/0257182 A1    Sep. 7, 2017

Related U.S. Application Data

(63) Continuation of application No. 14/904,031, filed as application No. PCT/JP2014/001793 on Mar. 27, 2014, now Pat. No. 9,692,545.

(30) Foreign Application Priority Data

Jul. 11, 2013 (JP) ................................ 2013-145238

(51) Int. Cl.
*H04B 10/06* (2006.01)
*H04J 14/02* (2006.01)
(Continued)

(52) U.S. Cl.
CPC ...... *H04J 14/0221* (2013.01); *H04B 10/0797* (2013.01); *H04B 10/0799* (2013.01);
(Continued)

(58) Field of Classification Search
CPC ...... H04B 10/60; H04B 10/614; H04B 10/61; H04B 10/611; H04B 10/63;
(Continued)

(56) References Cited

U.S. PATENT DOCUMENTS 5,471,336 A    11/1995 Onaka et al.
7,936,999 B1 *  5/2011 Hawryluck ............ H04B 10/60
                                                    398/152

(Continued)

FOREIGN PATENT DOCUMENTS

EP    2 566 072 A1    3/2013
JP    3-140026         6/1991
(Continued)

OTHER PUBLICATIONS

Decision of Grant a Patent dated May 9, 2017, by the Japanese Patent Office in counterpart Japanese Patent Application No. 2015-526135.

(Continued)

*Primary Examiner* — Hibret Woldekidan
(74) *Attorney, Agent, or Firm* — Finnegan, Henderson, Farabow, Garrett & Dunner, L.L.P.

(57) ABSTRACT

An optical reception apparatus (1) of the present invention includes: a local oscillator (11) outputting local oscillation light (22); an optical mixer (12) receiving a multiplexed optical signal (21) and the local oscillation light, and selectively outputting an optical signal (23) corresponding to the wavelength of the local oscillation light from the multiplexed optical signal; a photoelectric converter (13) converting the optical signal (23) output from the optical mixer into an electric signal (24); a variable gain amplifier (15) amplifying the electric signal (24) to generate an output signal (25) whose output amplitude is amplified to a certain level; a gain control signal generating circuit (16) generating a gain control signal (26) for controlling the gain of the variable gain amplifier (15); and a monitor signal generating unit (17) generating a monitor signal (27) corresponding to the power of the optical signal (23) using the gain control signal (26).

17 Claims, 9 Drawing Sheets

(51) Int. Cl.
*H04B 10/61* (2013.01)
*H04B 10/079* (2013.01)
*H04J 14/06* (2006.01)

(52) U.S. Cl.
CPC ....... *H04B 10/07957* (2013.01); *H04B 10/61* (2013.01); *H04B 10/615* (2013.01); *H04B 10/616* (2013.01); *H04J 14/06* (2013.01)

(58) Field of Classification Search
CPC .......... H04B 10/07955; H04B 10/64; H04B 10/671; H04B 10/07957; H04B 10/0797; H04B 10/0799; H04B 10/616; H04B 10/615; H04B 10/572; H04J 14/02; H04J 14/0221; H04J 14/06; G01J 1/0418
USPC ................ 398/202–204, 208–210, 213, 137
See application file for complete search history.

(56) References Cited

U.S. PATENT DOCUMENTS

| | | | | |
|---|---|---|---|---|
| 8,014,685 B2* | 9/2011 | Hoshida | | H04B 10/61 |
| | | | | 398/152 |
| 8,078,064 B2* | 12/2011 | Ito | | H04B 10/61 |
| | | | | 398/202 |
| 8,249,464 B2 | 8/2012 | Oda et al. | | |
| 8,301,039 B2* | 10/2012 | Nishihara | | H04B 10/61 |
| | | | | 375/229 |
| 8,391,725 B2 | 3/2013 | Oda et al. | | |
| 8,649,690 B2* | 2/2014 | Gehrke | | H04B 10/07955 |
| | | | | 398/136 |
| 8,655,190 B2* | 2/2014 | Wu | | H04B 10/5053 |
| | | | | 398/202 |
| 9,020,366 B2 | 4/2015 | Okamoto | | |
| 9,048,956 B2 | 6/2015 | Suzuki | | |
| 9,252,888 B2 | 2/2016 | Morie et al. | | |
| 9,285,267 B2* | 3/2016 | Gehrke | | H04B 10/07955 |
| 9,419,743 B2 | 8/2016 | Barnard | | |
| 9,647,753 B1* | 5/2017 | Kurisu | | H04B 10/07957 |
| 9,692,545 B2* | 6/2017 | Yamauchi | | H04B 10/0799 |
| 10,020,879 B2* | 7/2018 | Saito | | H04B 10/6931 |
| 10,033,468 B2* | 7/2018 | Suzuki | | H04B 10/612 |
| 10,044,439 B2* | 8/2018 | Kurisu | | H04B 10/6166 |
| 2010/0254718 A1* | 10/2010 | Oda | | H04B 10/60 |
| | | | | 398/202 |
| 2012/0177368 A1 | 7/2012 | Aoki | | |
| 2013/0071109 A1 | 3/2013 | Khatana et al. | | |
| 2013/0236172 A1* | 9/2013 | Suzuki | | H04B 10/612 |
| | | | | 398/43 |
| 2013/0322876 A1* | 12/2013 | Gehrke | | H04B 10/07955 |
| | | | | 398/38 |
| 2013/0343751 A1* | 12/2013 | Mamyshev | | H04B 10/61 |
| | | | | 398/38 |
| 2014/0348515 A1* | 11/2014 | Tsubouchi | | H04B 10/613 |
| | | | | 398/202 |

FOREIGN PATENT DOCUMENTS

| | | | | |
|---|---|---|---|---|
| JP | 4-212530 | 8/1992 | | |
| JP | 06-311110 | 11/1994 | | |
| JP | 2012-70234 | 4/2012 | | |
| WO | WO 2012066859 A1 * | 5/2012 | ........... | H04B 10/612 |
| WO | WO 2012/140922 A1 | 10/2012 | | |
| WO | WO 2013/088694 A1 | 6/2013 | | |

OTHER PUBLICATIONS

T. Uchikata et al., "A High accuracy channel power extraction method in optical filter-less coherent detection for flexible ROADM", OECC, pp. 761-762, Jul. 2012.
International Search Report dated Jun. 3, 2014 in corresponding PCT International Application.
Notification of Reasons for Refusal dated May 22, 2018, Issued by the Japanese Patent Office in counterpart Japanese Patent Application No. 2017-109792.

* cited by examiner

OPTICAL RECEPTION APPARATUS AND MONITOR SIGNAL GENERATING METHOD

CROSS-REFERENCE TO RELATED PATENT APPLICATIONS

This application is a continuation of U.S. application Ser. No. 14/904,031, filed Jan. 8, 2016, which is a National Stage Entry of International Application No. PCT/JP2014/001793, filed Mar. 27, 2014, which claims priority from Japanese Patent Application No. 2013-145238, filed Jul. 11, 2013. The contents of the above-referenced applications are expressly incorporated herein by reference each of these applications are incorporated herein by reference.

TECHNICAL FIELD

The present invention relates to an optical reception apparatus and a monitor signal generating method, and particularly to an optical reception apparatus and a monitor signal generating method using the coherent light transmission scheme.

BACKGROUND ART

The wavelength division multiplexing (WDM) communication belongs to the optical communication technology. In the wavelength division multiplexing communication, since a multiplexed optical signal in which optical signals of a plurality of wavelengths are multiplexed is used, large-volume information can be transmitted with a single optical fiber. Further, there is a technique of selectively extracting a particular optical signal from the multiplexed optical signal, which is referred to as the coherent light transmission scheme. In the coherent light transmission scheme, by allowing the multiplexed optical signal and local oscillation light to interfere with each other and performing a coherent detection, an optical signal corresponding to the wavelength of the local oscillation light is selectively extracted from the multiplexed optical signal.

Patent Literatures 1 and 2 each disclose a technique relating to the coherent light transmission scheme. Patent Literature 1 discloses a technique of stabilizing the absolute wavelength of a local oscillation light source and a transmission light source, thereby making it easier to set the wavelength. Patent Literature 2 discloses a technique for improving the S/N ratio in the reception characteristic while suppressing an increase in costs, even in the case where a multiplexed optical signal is selectively received by the wavelength of local oscillation light.

CITATION LIST

Patent Literature

Patent Literature 1: Japanese Unexamined Patent Application Publication No. H04-212530
Patent Literature 2: Japanese Unexamined Patent Application Publication No. 2012-070234

SUMMARY OF INVENTION

Technical Problem

In the coherent light transmission scheme disclosed in Patent Literatures 1 and 2, a multiplexed optical signal transmitted from an optical transmission apparatus is received using an optical reception apparatus. For example, the power of the multiplexed optical signal input to the optical reception apparatus can be monitored by branching the multiplexed optical signal input to the optical reception apparatus with an optical coupler or the like, and converting the branched multiplexed optical signal to an electric signal with a monitor-purpose photoelectric converter.

However, since a multiplexed optical signal is an optical signal in which optical signals of a plurality of wavelengths are multiplexed, when a multiplexed optical signal input to the optical reception apparatus is monitored, all the optical signals input to the optical reception apparatus are monitored. Hence, in this case, there is a problem that the power of an optical signal of a particular wavelength cannot be measured solely.

In view of the problem described above, an object of the present invention is to provide an optical reception apparatus and a monitor signal generating method, with which the power of an optical signal of a particular wavelength can be monitored.

Solution to Problem

An optical reception apparatus of the present invention includes:
a local oscillator outputting local oscillation light having a prescribed wavelength;
an optical mixer receiving a multiplexed optical signal in which optical signals being different in wavelength from each other are multiplexed and the local oscillation light, and selectively outputting an optical signal corresponding to the wavelength of the local oscillation light from the multiplexed optical signal;
a photoelectric converter converting the optical signal output from the optical mixer to an electric signal;
a variable gain amplifier amplifying the electric signal converted by the photoelectric converter, to generate an output signal whose output amplitude is amplified to a certain level;
a gain control signal generating circuit generating a gain control signal for controlling a gain of the variable gain amplifier; and
a monitor signal generating unit generating, using the gain control signal, a monitor signal corresponding to power of the optical signal output from the optical mixer.

A monitor signal generating method of the present invention is a monitor signal generating method for generating a monitor signal corresponding to power of an optical signal received by an optical reception apparatus, the method including:
causing a multiplexed optical signal in which optical signals being different in wavelength from each other are multiplexed and local oscillation light having a prescribed wavelength to interfere with each other, to extract an optical signal corresponding to the wavelength of the local oscillation light from the multiplexed optical signal;
converting the extracted optical signal into an electric signal;
amplifying the electric signal using a variable gain amplifier, to generate an output signal whose output amplitude is amplified to a certain level;
generating a gain control signal for controlling a gain of the variable gain amplifier; and
generating a monitor signal corresponding to the power of the optical signal using the gain control signal.

Advantageous Effects of Invention

The present invention can provide an optical reception apparatus and a monitor signal generating method, with which the power of an optical signal of a particular wavelength can be monitored.

DESCRIPTION OF EMBODIMENTS

First Embodiment

Figure 1:
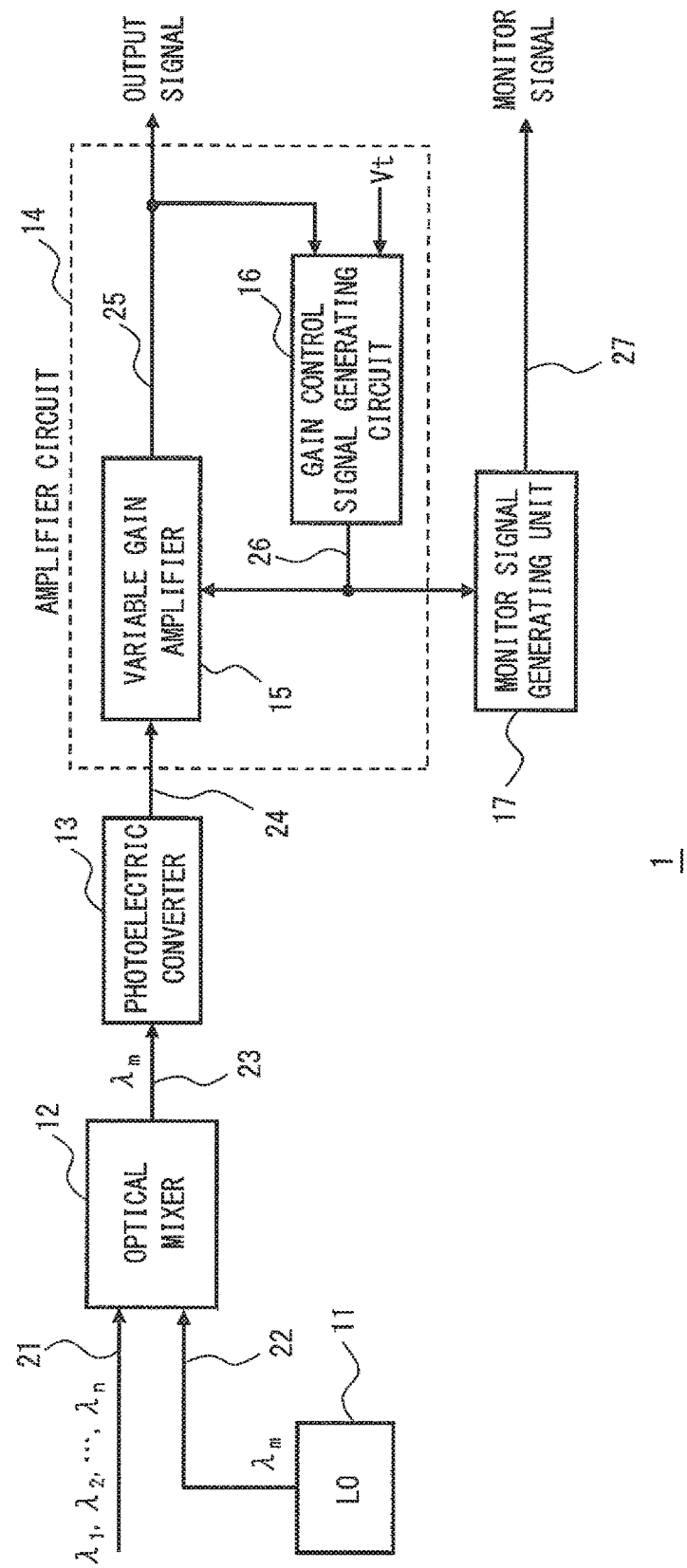
FIG. 1 is a block diagram showing an optical reception apparatus according to a first embodiment.

In the following, with reference to the drawings, a description will be given of embodiments of the present invention. FIG. 1 is a block diagram showing an optical reception apparatus 1 according to a first embodiment. As shown in FIG. 1, the optical reception apparatus 1 according to the present embodiment includes a local oscillator (LO) 11, an optical mixer 12, a photoelectric converter 13, a variable gain amplifier 15, a gain control signal generating circuit 16, and a monitor signal generating unit 17. Here, the variable gain amplifier 15 and the gain control signal generating circuit 16 configure an amplifier circuit 14.

The optical reception apparatus 1 receives a multiplexed optical signal 21 generated on the transmission apparatus side (not shown). The multiplexed optical signal 21 is an optical signal in which optical signals being different in wavelength from each other are multiplexed. That is, the multiplexed optical signal 21 is an optical signal in which a plurality of optical signals respectively having different wavelengths $\lambda_1, \lambda_2, \ldots, \lambda_n$ (n is an integer equal to or greater than 2) are multiplexed. In the WDM communication, since such a multiplexed optical signal is used, large-volume information can be transmitted with a single optical fiber.

The local oscillator 11 outputs local oscillation light 22 having a prescribed wavelength $\lambda_m$ (m=1 to n) to the optical mixer 12. That is, the local oscillator 11 outputs, to the optical mixer 12, the local oscillation light 22 of a wavelength $\lambda_m$ corresponding to the wavelength of an optical signal to be extracted from the multiplexed optical signal 21. For example, the local oscillator 11 includes a wavelength variable laser, and is capable of changing the wavelength $\lambda_m$ of the local oscillation light 22 output from the local oscillator 11 so as to correspond to the wavelength of an optical signal to be extracted from the multiplexed optical signal 21.

The optical mixer 12 receives the multiplexed optical signal 21 and the local oscillation light 22, and selects an optical signal 23 corresponding to the wavelength of the local oscillation light 22 from the multiplexed optical signal 21. Then, the optical mixer 12 outputs the selected optical signal 23 to the photoelectric converter 13. In the coherent light transmission scheme, by causing the multiplexed optical signal 21 and the local oscillation light 22 to interfere with each other and performing a coherent detection, an optical signal corresponding to the wavelength $\lambda_m$ of the local oscillation light 22 can be selectively extracted from the multiplexed optical signal 21 in which a plurality of optical signals having the wavelengths $\lambda_1, \lambda_2, \ldots, \lambda_n$ are multiplexed. Hence, by changing the wavelength $\lambda_m$ of the local oscillation light 22 output from the local oscillator 11, an optical signal to be extracted from the multiplexed optical signal 21 can be arbitrarily selected.

The photoelectric converter 13 converts the optical signal 23 output from the optical mixer 12 to an electric signal 24, and outputs the electric signal 24 to the amplifier circuit 14. The photoelectric converter 13 may be, for example, a photodiode.

The amplifier circuit 14 includes the variable gain amplifier 15 and the gain control signal generating circuit 16. The amplifier circuit 14 configures an AGC (Automatic Gain Control) circuit.

The variable gain amplifier 15 amplifies the electric signal 24 output from the photoelectric converter 13, and generates an output signal 25 whose output amplitude is amplified to a certain level. At this time, the variable gain amplifier 15 adjusts the gain of the variable gain amplifier 15 in accordance with a gain control signal 26 generated by the gain control signal generating circuit 16.

The gain control signal generating circuit 16 generates the gain control signal 26 for controlling the gain of the variable gain amplifier 15. For example, the gain control signal generating circuit 16 generates, based on the amplitude voltage of the output signal 25 output from the variable gain amplifier 15 and a preset target voltage Vt, the gain control signal 26 for feedback-controlling the variable gain amplifier 15.

For example, the gain control signal generating circuit 16 generates the gain control signal 26 with which the amplitude voltage of the output signal 25 output from the variable gain amplifier 15 (in other words, the absolute value of the amplitude voltage of the output signal 25) and the target voltage Vt become equal to each other. Specifically, when the amplitude voltage of the output signal 25 is greater than the target voltage Vt, the gain control signal generating circuit 16 generates the gain control signal 26 with which the gain of the variable gain amplifier 15 reduces. Conversely, when the amplitude voltage of the output signal 25 is smaller than the target voltage Vt, the gain control signal generating circuit 16 generates the gain control signal 26 with which the gain of the variable gain amplifier 15 increases.

Figure 2:
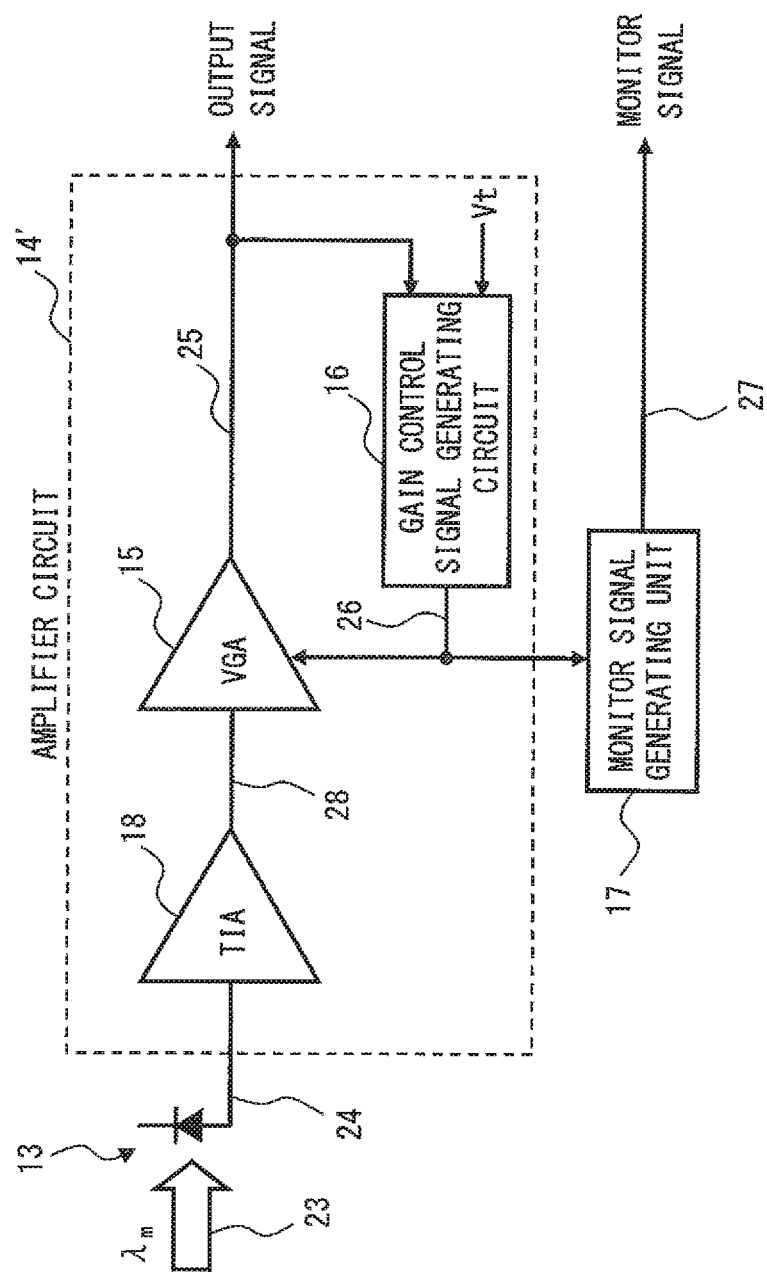
FIG. 2 is a circuit diagram showing one example of an amplifier circuit included in the optical reception apparatus according to the first embodiment.

Note that, in the present embodiment, as an amplifier circuit 14' shown in FIG. 2, a transimpedance amplifier 18 may be provided between the photoelectric converter 13 and the variable gain amplifier 15. For example, when the electric signal 24 output from the photoelectric converter 13 is a current signal, by providing the transimpedance amplifier 18, the current signal can be converted to a voltage signal.

The monitor signal generating unit 17 generates a monitor signal 27 using the gain control signal 26. The monitor signal 27 is a signal corresponding to the power of the optical signal 23 output from the optical mixer 12 (that is, the optical signal 23 selected from the multiplexed optical signal 21).

For example, when the variable gain amplifier 15 is configured such that the amplification factor of the variable gain amplifier 15 increases as the signal voltage of the gain control signal 26 becomes higher, the relationship between the power of the optical signal 23 and the gain control signal 26 is as follows. When the power of the optical signal 23 is excessively small, the amplitude voltage of the electric signal 24 also becomes small. In this case, since the difference between the amplitude voltage of the output signal 25 and the target voltage Vt becomes great, the amplification factor of the variable gain amplifier 15 must be increased. Hence, the signal voltage of the gain control signal 26 generated by the gain control signal generating circuit 16 becomes high. On the other hand, when the power of the optical signal 23 is close to the target value, the difference between the amplitude voltage of the output signal 25 and the target voltage Vt becomes small. In this case, since the amplification factor of the variable gain amplifier 15 becomes small, the signal voltage of the gain control signal 26 generated by the gain control signal generating circuit 16 becomes low.

Further, for example, when the variable gain amplifier 15 is configured such that the amplification factor of the variable gain amplifier 15 increases as the signal voltage of the gain control signal 26 becomes lower, the relationship between the power of the optical signal 23 and the gain control signal 26 is as follows. When the power of the optical signal 23 is excessively small, the amplitude voltage of the electric signal 24 also becomes small. In this case, since the difference between the amplitude voltage of the output signal 25 and the target voltage Vt becomes great, the amplification factor in the variable gain amplifier 15 must be increased. Hence, the signal voltage of the gain control signal 26 generated by the gain control signal generating circuit 16 becomes low. On the other hand, when the power of the optical signal 23 is close to the target value, the difference between the amplitude voltage of the output signal 25 and the target voltage Vt becomes small. In this case, since the amplification factor in the variable gain amplifier 15 becomes small, the signal voltage of the gain control signal 26 generated by the gain control signal generating circuit 16 becomes high.

In this manner, the gain control signal 26 varies in accordance with the power of the optical signal 23. The monitor signal generating unit 17 can generate the monitor signal 27 corresponding to the power of the optical signal 23 using the gain control signal 26 which varies in this manner. For example, the monitor signal generating unit 17 may include an analog-digital converter circuit. In this case, the gain control signal 26 being an analog signal can be converted into a digital signal.

Note that, the optical reception apparatus 1 according to the present embodiment may further include an analog-digital converter circuit (not shown) that converts the output signal 25 from an analog signal to a digital signal, and a digital signal processing circuit (not shown) that processes the output signal converted into a digital signal.

In the coherent light transmission scheme disclosed in Patent Literatures 1 and 2, a multiplexed optical signal transmitted from an optical transmission apparatus is received using an optical reception apparatus. For example, the power of a multiplexed optical signal input to the optical reception apparatus can be monitored by branching the multiplexed optical signal input to the optical reception apparatus with an optical coupler or the like, and converting the branched multiplexed optical signal to an electric signal with a monitor-purpose photoelectric converter.

Figure 9:
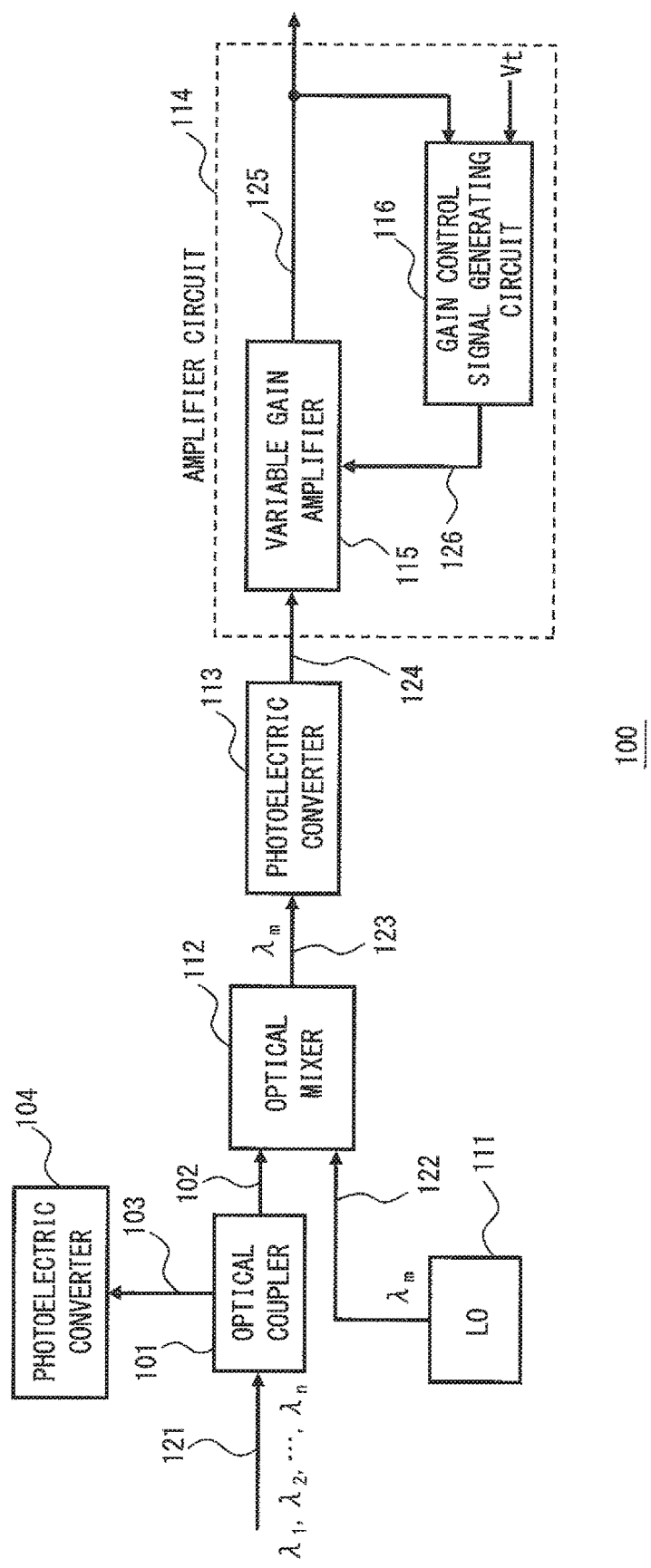
FIG. 9 is a block diagram showing an optical reception apparatus according to Comparative Example.

FIG. 9 is a block diagram showing an optical reception apparatus 100 according to Comparative Example. The optical reception apparatus 100 shown in FIG. 9 includes an optical coupler 101, a photoelectric converter 104, a local oscillator (LO) 111, an optical mixer 112, a photoelectric converter 113, a variable gain amplifier 115, and a gain control signal generating circuit 116. The variable gain amplifier 115 and the gain control signal generating circuit 116 configure an amplifier circuit 114. Note that, in the optical reception apparatus 100 shown in FIG. 9, constituent elements identical to those of the optical reception apparatus 1 shown in FIG. 1 are denoted by the reference numerals in the 100 s.

In the optical reception apparatus 100 shown in FIG. 9, the multiplexed optical signal 121 input to the optical reception apparatus 100 is branched by the optical coupler 101, and one multiplexed optical signal 102 is input to the optical mixer 112 while other multiplexed optical signal 103 is input to the photoelectric converter 104. Then, by converting the branched multiplexed optical signal 103 to an electric signal by the photoelectric converter 104, the power of the multiplexed optical signal 121 input to the optical reception apparatus 100 can be monitored.

However, since the multiplexed optical signal 121 is an optical signal in which optical signals of a plurality of wavelengths are multiplexed, when the multiplexed optical signal 121 input to the optical reception apparatus 100 is monitored, all the optical signals input to the optical reception apparatus 100 are monitored. Hence, in this case, the power of an optical signal of a particular wavelength 123 cannot be measured solely.

Accordingly, in the optical reception apparatus 1 according to the present embodiment, as shown in FIG. 1, using the gain control signal 26 for controlling the gain of the variable gain amplifier 15, the monitor signal 27 corresponding to the power of the optical signal 23 output from the optical mixer 12 is generated. That is, the variable gain amplifier 15 amplifies solely the electric signal 24 corresponding to the optical signal 23 selected from the multiplexed optical signal 21. Further, the gain control signal 26 is a signal for controlling the gain of the variable gain amplifier 15, and varies in accordance with the power of the optical signal 23. Hence, by generating the monitor signal 27 using the gain control signal 26, the power of the optical signal 23 can be monitored.

Further, with the optical reception apparatus 1 according to the present embodiment, since the power of the optical signal 23 is monitored using the gain control signal 26, it is not necessary to provide the optical coupler 101 for branching the multiplexed optical signal or the monitor-purpose photoelectric converter 104 (see FIG. 9). Further, with the optical reception apparatus 1 of the present embodiment, by causing the multiplexed optical signal 21 and the local oscillation light 22 to interfere with each other and performing a coherent detection, the optical signal 23 corresponding to the wavelength of the local oscillation light 22 is selectively extracted from the multiplexed optical signal 21. Hence, it is not necessary to provide an arrayed waveguide grating (AWG) or an optical filter for extracting an optical signal from a multiplexed optical signal. Accordingly, the optical reception apparatus can be reduced in size, and the manufacturing costs of the optical reception apparatus can be reduced.

By the invention according to the present embodiment described above, the optical reception apparatus and the monitor signal generating method with which the power of an optical signal of a particular wavelength can be monitored can be provided.

Second Embodiment

Next, a description will be given of a second embodiment of the present invention. In the present embodiment, a description will be given of the case where the optical reception apparatus described in the first embodiment is applied to the dual polarization quadrature phase shift keying (DP-QPSK) scheme.

Figure 3:
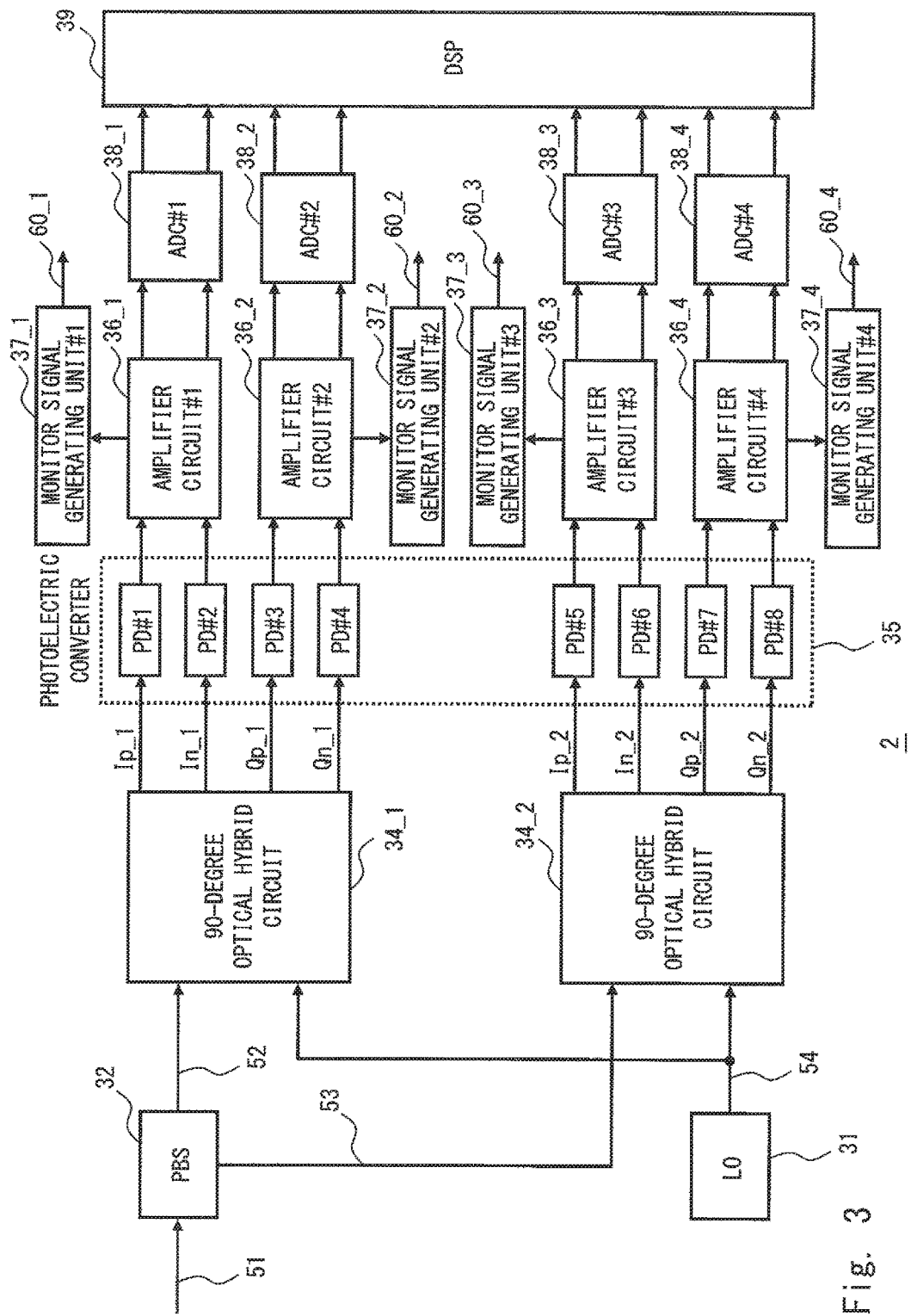
FIG. 3 is a block diagram showing an optical reception apparatus according to a second embodiment.

FIG. 3 is a block diagram showing an optical reception apparatus 2 according to the present embodiment. As shown in FIG. 3, the optical reception apparatus 2 according to the present embodiment includes a local oscillator (LO) 31, a polarization beam splitter (PBS) 32, a 90-degree optical hybrid circuit 34_1, 34_2, a photoelectric converter 35, amplifier circuits 36_1 to 36_4, monitor signal generating units 37_1 to 37_4, analog-digital converter circuits 38_1 to 38_4, and a digital signal processing circuit 39.

The optical reception apparatus 2 receives a multiplexed optical signal 51 generated on the transmission apparatus side (not shown). The multiplexed optical signal 51 is an optical signal in which optical signals being different in wavelength from each other are multiplexed. Further, in the present embodiment, in the multiplexed optical signal 51, X polarized light (first polarized light) and Y polarized light (second polarized light) being orthogonal to each other are multiplexed. The X polarized light and the Y polarized light are modulated independently of each other, and capable of independently transmitting information. Further, the X polarized light and the Y polarized light are each modulated by four different phases.

The polarization beam splitter 32 receives the multiplexed optical signal 51, and splits the multiplexed optical signal 51 into the X polarized light 52 and the Y polarized light 53 being orthogonal to each other. Then, the polarization beam splitter 32 outputs the split X polarized light 52 to the 90-degree optical hybrid circuit 34_1 (a first optical hybrid circuit), and outputs the split Y polarized light to the 90-degree optical hybrid circuit 34_2 (a second optical hybrid circuit).

The local oscillator 31 outputs local oscillation light 54 having a prescribed wavelength to each of the 90-degree optical hybrid circuits 34_1, 34_2. That is, the local oscillator 31 outputs, to 90-degree optical hybrid circuits 34_1, 34_2, the local oscillation light 54 having the wavelength corresponding to the wavelength of an optical signal to be extracted from the multiplexed optical signal 51. For example, the local oscillator 31 is configured to include a wavelength variable laser, and capable of varying the wavelength of the local oscillation light 54 output from the local oscillator 31 so as to correspond to the wavelength of the optical signal to be extracted from the multiplexed optical signal 51.

The 90-degree optical hybrid circuit 34_1 includes an optical mixer (a first optical mixer). The 90-degree optical hybrid circuit 34_1 receives the X polarized light 52 and the local oscillation light 54 and causes the X polarized light 52 and the local oscillation light 54 to interfere with each other, thereby separating an optical signal corresponding to the wavelength of the local oscillation light 31 from the X polarized light 52. Further, the 90-degree optical hybrid circuit 34_1 splits the X polarized light 52 into an in-phase component (the I component) and a quadrature component (the Q component). Then, the 90-degree optical hybrid circuit 34_1 outputs two optical signals included in the in-phase component as first differential signals, and outputs two optical signals included in the quadrature component as second differential signals.

Figure 4:
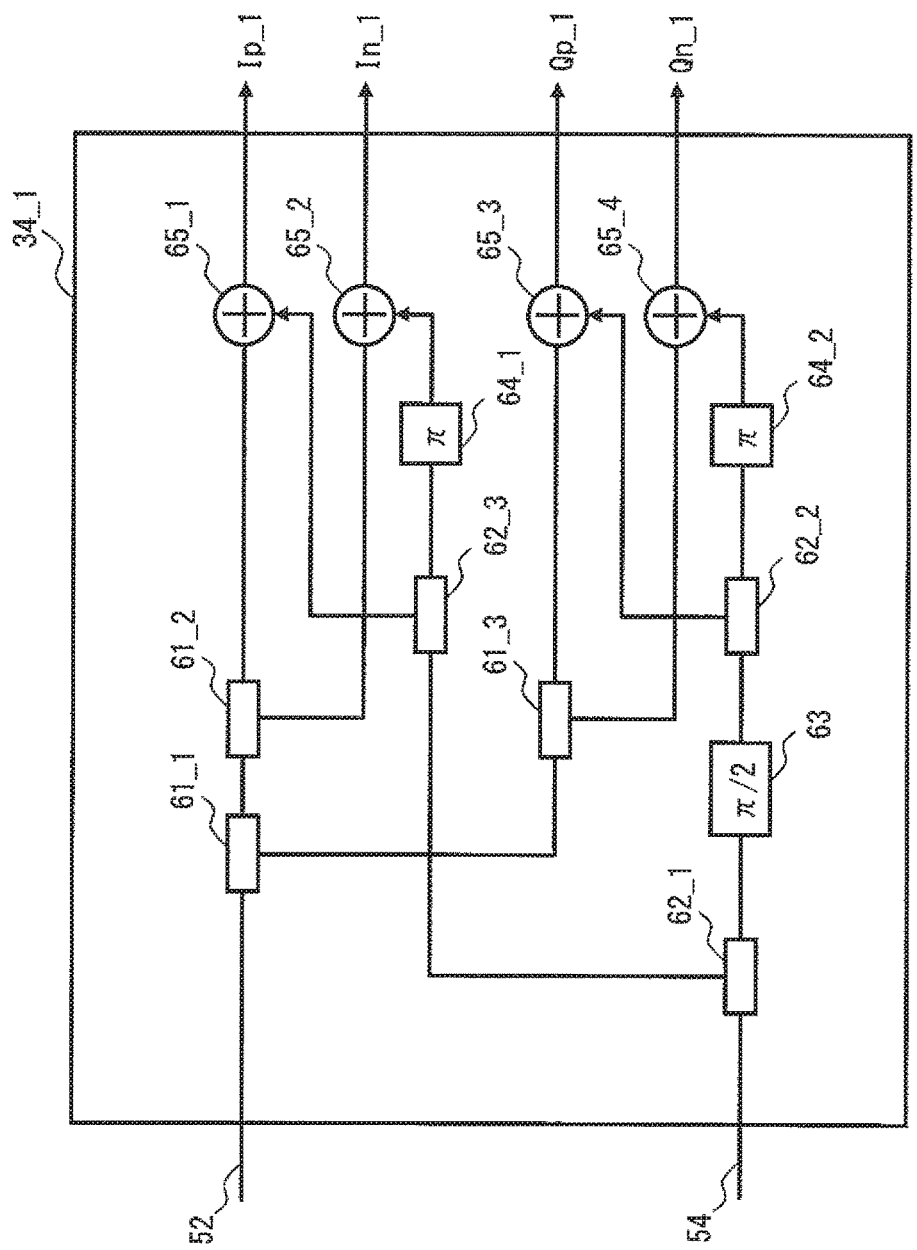
FIG. 4 is a diagram showing a 90-degree optical hybrid circuit included in the optical reception apparatus according to the second embodiment.

FIG. 4 is a diagram showing one example of the 90-degree optical hybrid circuit 34_1. As shown in FIG. 4, the 90-degree optical hybrid circuit 34_1 includes optical couplers 61_1 to 61_3, 62_1 to 62_3, a $\pi/2$ phase shifter 63, n phase shifters 64_1, 64_2, and optical mixers 65_1 to 65_4 (the first optical mixer).

The X polarized light 52 input to the 90-degree optical hybrid circuit 34_1 is branched by the optical couplers 61_1 to 61_3, and introduced to the optical mixers 65_1 to 65_4. The local oscillation light 54 input to the 90-degree optical hybrid circuit 34_1 is branched by the optical coupler 62_1 and the optical coupler 62_3, and thereafter introduced to the optical mixer 65_1. The local oscillation light 54 input to the 90-degree optical hybrid circuit 34_1 is branched by the optical coupler 62_1 and the optical coupler 62_3, and thereafter has its phase shifted by n by the n phase shifter 64_1, to be introduced to the optical mixer 65_2.

The local oscillation light 54 input to the 90-degree optical hybrid circuit 34_1 is branched by the optical coupler 62_1, and thereafter has its phase shifted by $\pi/2$ by the $\pi/2$ phase shifter 63. The local oscillation light 54 is further branched by the optical coupler 62_2 and thereafter introduced to optical mixer 65_3. The local oscillation light 54 input to the 90-degree optical hybrid circuit 34_1 is branched by the optical coupler 62_1, and thereafter has its phase shifted by $\pi/2$ by the $\pi/2$ phase shifter 63. The local oscillation light 54 is further branched by the optical coupler 62_2, and thereafter has its phase shifted by $\pi$ by the $\pi$ phase shifter 64_2, to be introduced to the optical mixer 65_4.

That is, the optical mixer 65_1 receives the local oscillation light 54 which is in-phase; the optical mixer 65_2 receives the local oscillation light 54 which is out of phase by 7E; the optical mixer 65_3 receives the local oscillation light 54 which is out of phase by $\pi/2$; and the optical mixer 65_4 receives the local oscillation light 54 which is out of phase by $3\pi/2$.

Therefore, the optical mixer 65_1 outputs an optical signal Ip_1 which is in-phase; the optical mixer 65_2 outputs an optical signal In_1 which is out of phase by 7E; the optical mixer 65_3 outputs an optical signal Qp_1 which is out of phase by $\pi/2$; and the optical mixer 65_4 outputs an optical signal Qn_1 which is out of phase by $3\pi/2$. The optical signal Ip_1 and the optical signal In_1 are output as the first differential signals (differential signals of the in-phase component), and the optical signal Qp_1 and the optical signal Qn_1 are output as the second differential signals (the differential signals of the quadrature component).

The 90-degree optical hybrid circuit 34_2 operates similarly to the 90-degree optical hybrid circuit 34_1. That is, the 90-degree optical hybrid circuit 34_2 includes an optical mixer (a second optical mixer). The 90-degree optical hybrid circuit 34_2 receives the Y polarized light 53 and the local oscillation light 54 and causes the Y polarized light 53 and the local oscillation light 54 to interfere with each other, thereby separating an optical signal corresponding to the wavelength of the local oscillation light 31 from the Y polarized light 53. Further, the 90-degree optical hybrid circuit 34_2 splits the Y polarized light 53 into the in-phase component (the I component) and the quadrature component (the Q component). Then, the 90-degree optical hybrid circuit 34_2 outputs two optical signals (Ip_2, In_2) included in the in-phase component as third differential signals, and outputs two optical signals (Qp_2, Qn_2) included in the quadrature component as fourth differential signals.

As shown in FIG. 3, the optical signals Ip_1, In_1 (the first differential signals), the optical signals Qp_1, Qn_1 (the second differential signals), the optical signals Ip_2, In_2 (the third differential signals), and the optical signals Qp_2, Qn_2 (the fourth differential signal) output from the 90-degree optical hybrid circuits 34_1, 34_2 are respectively converted by photoelectric converters PD#1 to PD#8 to electric signals.

The amplifier circuit 36_1 amplifies the electric signals corresponding to the first differential signals (Ip_1, In_1) output from the photoelectric converters PD#1, PD#2, and generates output signals whose output amplitude is amplified to a certain level. The generated output signals are output to the analog-digital converter circuit 38_1. The analog-digital converter circuit 38_1 converts the output signals from analog signals to digital signals, and outputs the digital signals to the digital signal processing circuit 39. The monitor signal generating unit 37_1 generates a monitor signal 60_1 corresponding to the first differential signals (Ip_1, In_1).

The amplifier circuit 36_2 amplifies the electric signals corresponding to the second differential signals (Qp_1, Qn_1) output from the photoelectric converters PD#3, PD#4, and generates output signals whose output amplitude is amplified to a certain level. The generated output signals are output to the analog-digital converter circuit 38_2. The analog-digital converter circuit 38_2 converts the output signals from analog signals to digital signals, and outputs the digital signals to the digital signal processing circuit 39. The monitor signal generating unit 37_2 generates a monitor signal 60_2 corresponding to the second differential signals (Qp_1, Qn_1).

The amplifier circuit 36_3 amplifies the electric signals corresponding to the third differential signals (Ip_2, In_2) output from the photoelectric converters PD#5, PD#6, and generates output signals whose output amplitude is amplified to a certain level. The generated output signals are output to the analog-digital converter circuit 38_3. The analog-digital converter circuit 38_3 converts the output signals from analog signals to digital signals, and outputs the digital signals to the digital signal processing circuit 39. The monitor signal generating unit 37_3 generates a monitor signal 60_3 corresponding to the third differential signals (Ip_2, In_2).

The amplifier circuit 36_4 amplifies the electric signals corresponding to the fourth differential signals (Qp_2, Qn_2) output from the photoelectric converters PD#7, PD#8, and generates output signals whose output amplitude is amplified to a certain level. The generated output signals are output to the analog-digital converter circuit 38_4. The analog-digital converter circuit 38_4 converts the output signals from analog signals to digital signals, and outputs the digital signals to the digital signal processing circuit 39. The monitor signal generating unit 37_4 generates a monitor signal 60_4 corresponding to the fourth differential signals (Qp_2, Qn_2).

Figure 5:
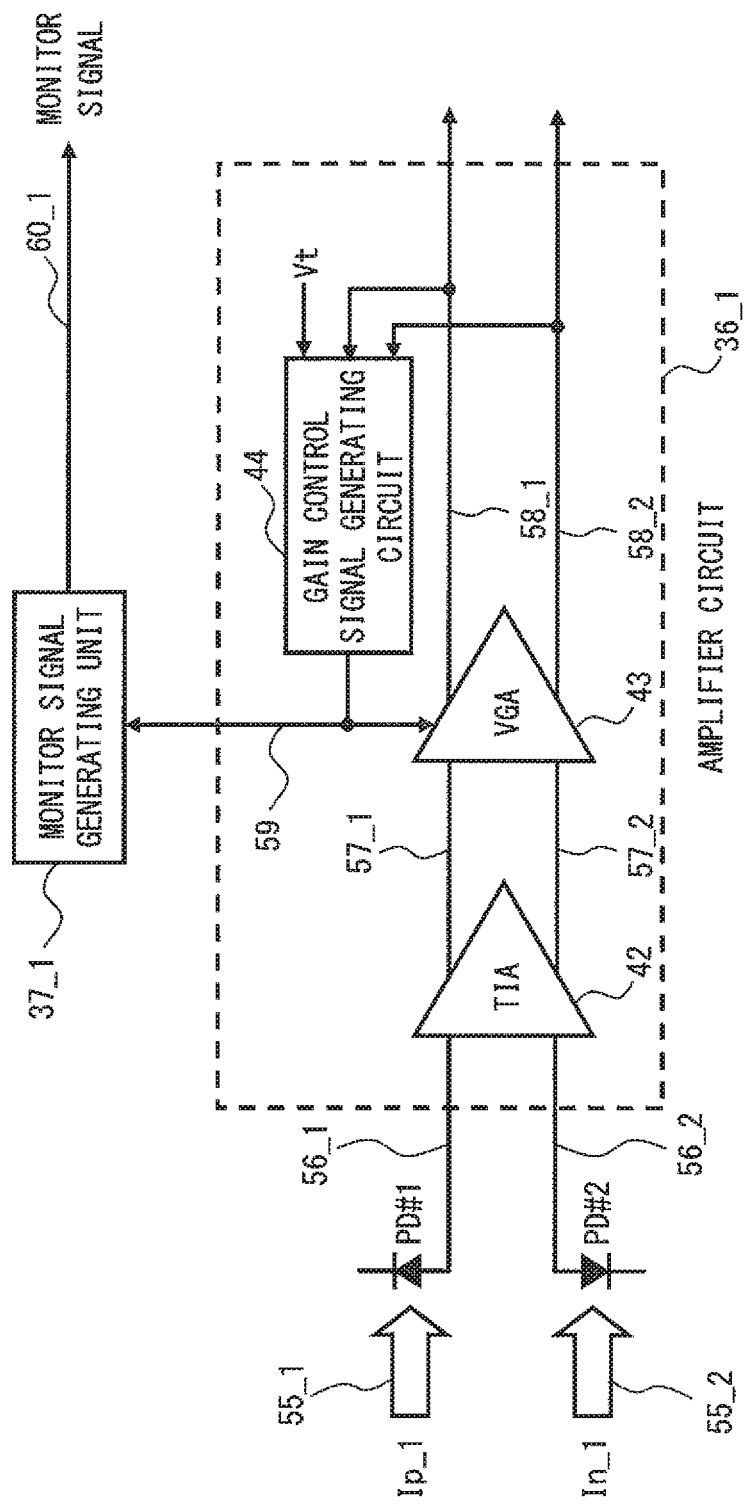
FIG. 5 is a block diagram for describing details of an amplifier circuit included in the optical reception apparatus according to the second embodiment.

FIG. 5 is a block diagram for describing details of the amplifier circuit 36_1 included in the optical reception apparatus 2 according to the present embodiment. While a description will be given of the amplifier circuit 36_1 in the following, the same holds true for other amplifier circuits 36_2 to 36_4.

The amplifier circuit 36_1 includes a transimpedance amplifier 42, a variable gain amplifier 43, and a gain control signal generating circuit 44. The amplifier circuit 36_1 configures an AGC circuit. The differential signals (Ip_1, In_1) output from the 90-degree optical hybrid circuit 34_1 are converted to differential signals 56_1, 56_2 by the photoelectric converters PD#1, PD#2, and supplied to the transimpedance amplifier 42. The transimpedance amplifier 42 converts the differential signals 56_1, 56_2 from current signals to voltage signals, and outputs differential signals 57_1, 57_2 to the variable gain amplifier 43. Note that, the transimpedance amplifier 42 may be omitted.

The variable gain amplifier 43 amplifies the differential signals 57_1, 57_2, and generates differential output signals 58_1, 58_2 whose output amplitude is amplified to a certain level. At this time, the variable gain amplifier 43 adjusts the gain of the variable gain amplifier 43 in accordance with a gain control signal 59 generated by the gain control signal generating circuit 44.

The gain control signal generating circuit 44 generates the gain control signal 59 for controlling the gain of the variable gain amplifier 43. For example, the gain control signal generating circuit 44 generates the gain control signal 59 for feedback-controlling the variable gain amplifier 43, based on the amplitude voltage of the differential output signals 58_1, 58_2 output from the variable gain amplifier 43 and the preset target voltage Vt.

For example, the gain control signal generating circuit 44 generates the gain control signal 59 with which the amplitude voltage of the differential output signals 58_1, 58_2 output from the variable gain amplifier 43 (in other words, the absolute value of the amplitude voltage of the differential output signals 58_1, 58_2) and the target voltage Vt become equal to each other. Specifically, when the amplitude voltage of the differential output signals 58_1, 58_2 is higher than the target voltage Vt, the gain control signal generating circuit 44 generates the gain control signal 59 with which the gain of the variable gain amplifier 43 reduces. Conversely, when the amplitude voltage of the differential output signals 58_1, 58_2 is lower than the target voltage Vt, the gain control signal generating circuit 44 generates the gain control signal 59 with which the gain of the variable gain amplifier 43 increases.

The monitor signal generating unit 37_1 generates the monitor signal 60_1 using the gain control signal 59. The monitor signal 60_1 is a signal corresponding to the power of the differential signals 55_1, 55_2 (Ip_1, In_1) output from the 90-degree optical hybrid circuit 34_1.

That is, as described in the first embodiment, the gain control signal 59 varies in accordance with the power of the differential signals 55_1, 55_2 (Ip_1, In_1). The monitor signal generating unit 37_1 can generate the monitor signal 60_1 corresponding to the power of the differential signals 55_1, 55_2 (Ip_1, In_1) using the gain control signal 59 varying in this manner. For example, the monitor signal generating unit 37_1 may include an analog-digital converter circuit. In this case, the gain control signal 59 being an analog signal can be converted to a digital signal.

In the optical reception apparatus 2 according to the present embodiment also, the power of the optical signals output from the 90-degree optical hybrid circuits 34_1, 34_2 is monitored using the gain control signal 59 for controlling the gain of the variable gain amplifier 43. Hence, the power of an optical signal of a particular wavelength can be monitored.

Note that, while the description has been given of the case where four monitor signal generating units 37_1 to 37_4 are included with reference to FIG. 3, at least one monitor signal generating unit will suffice. That is, the monitor signal generating unit may be provided for only the differential signals that must be monitored, out of the first differential signals (Ip_1, In_1), the second differential signals (Qp_1, Qn_1), the third differential signals (Ip_2, In_2), and the fourth differential signals (Qp_2, Qn_2).

Further, in the foregoing, the description has been given of the case where the multiplexed optical signal 51 includes the X polarized light and the Y polarized light. However, the invention according to the present embodiment may be applied also to the quadrature phase shift keying (QPSK) scheme in which no polarized light is used. In this case, the polarization beam splitter 32, the 90-degree optical hybrid circuit 34_2, the photoelectric converters PD#5 to PD#8, the amplifier circuits 36_3, 36_4, the monitor signal generating units 37_3, 37_4, and the analog-digital converter circuits 38_3, 38_4 can be omitted. In the case where the invention according to the present embodiment is applied to the quadrature phase shift keying scheme, the 90-degree optical hybrid circuit 34_1 receives a multiplexed optical signal and local oscillation light, and the 90-degree optical hybrid circuit 34_1 outputs four optical signals Ip_1, In_1, Qp_1, Qn_1 (in other words, two types of differential signals). The optical signals Ip_1, In_1, Qp_1, and Qn_1 are processed similarly to the manner described above.

Third Embodiment

Figure 6:
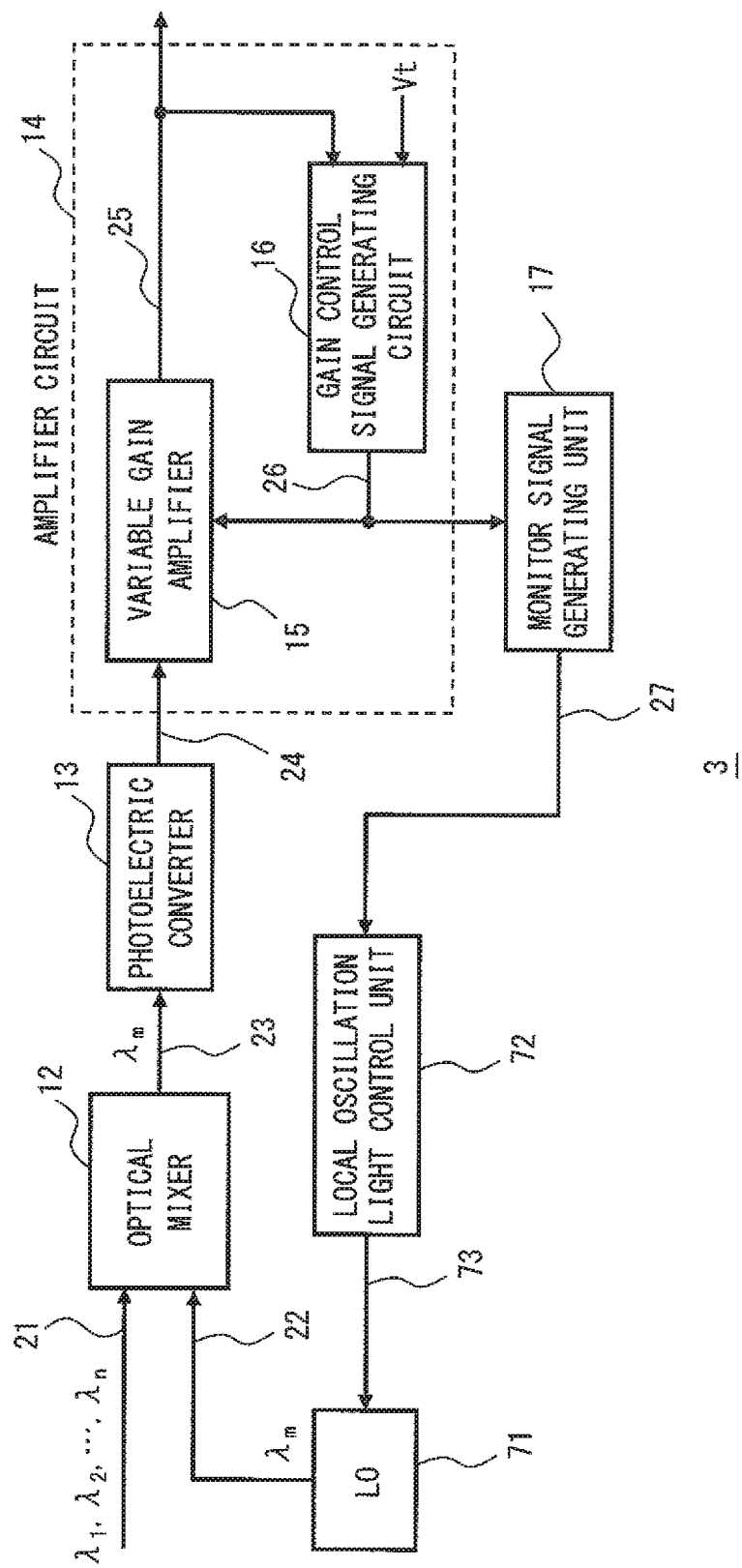
FIG. 6 is a block diagram showing an optical reception apparatus according to a third embodiment.

Next, a description will be given of a third embodiment of the present invention. FIG. 6 is a block diagram showing an optical reception apparatus according to the third embodiment. The optical reception apparatus 3 according to the third embodiment is different from the optical reception apparatus 1 described in the first embodiment in that the power of the local oscillation light 22 output from a local oscillator 71 is controlled in accordance with the monitor signal 27 generated by the monitor signal generating unit 17. Other configuration is similar to that of the optical reception apparatus 1 described in the first embodiment, and therefore identical constituent elements are denoted by identical reference numerals, and repetitive descriptions are omitted.

As shown in FIG. 6, the optical reception apparatus 3 according to the present embodiment includes the local oscillator (LO) 71, the optical mixer 12, the photoelectric converter 13, the variable gain amplifier 15, the gain control signal generating circuit 16, the monitor signal generating unit 17, and a local oscillation light control unit 72.

The optical mixer 12 receives the multiplexed optical signal 21 and the local oscillation light 22, and selects the optical signal 23 corresponding to the wavelength of the local oscillation light 22 from the multiplexed optical signal 21. Then, the optical mixer 12 outputs the selected optical signal 23 to the photoelectric converter 13. At this time, the optical mixer 12 causes the multiplexed optical signal 21 and the local oscillation light 22 to interfere with each other and performs a coherent detection, thereby selectively extracting the optical signal corresponding to the wavelength $\lambda_m$ of the local oscillation light 22 from the multiplexed optical signal 21. Hence, in order to properly extract the optical signal 23 of a particular wavelength from the multiplexed optical signal 21, it is necessary to adjust the power of the local oscillation light 22 input to the optical mixer 12 to a proper value.

Accordingly, with the optical reception apparatus 3 according to the present embodiment, the power of the local oscillation light 22 output from the local oscillator 71 is controlled in accordance with the monitor signal 27 generated by the monitor signal generating unit 17. That is, the local oscillation light control unit 72 generates a control signal 73 for controlling the local oscillator 71 in accordance with the monitor signal 27, and outputs the control signal 73 to the local oscillator 71. The local oscillator 71 adjusts the power of the local oscillation light 22 in accordance with the control signal 73.

For example, when the power of the local oscillation light 22 is excessively small, the power of the optical signal 23 output from the optical mixer 12 also becomes small. At this time, since the monitor signal 27 indicates that the power of the optical signal 23 is excessively small, the local oscillation light control unit 72 controls the local oscillator 71 to increase the power of the local oscillation light 22.

Further, for example when the power of the local oscillation light 22 is excessively great, the power of the optical signal 23 output from the optical mixer 12 also becomes great. At this time, since the monitor signal 27 indicates that the power of the optical signal 23 is excessively great, the local oscillation light control unit 72 controls the local oscillator 71 to reduce the power of the local oscillation light 22.

For example, the local oscillation light control unit 72 may control the power of the local oscillation light 22 such that the value of the monitor signal 27 (that is, the power value of the optical signal 23) attains a prescribed value. Here, such a prescribed value can be arbitrarily determined.

In this manner, since the optical reception apparatus 3 according to the present embodiment can control the power of the local oscillation light 22 in accordance with the monitor signal 27, the optical signal 23 having prescribed power can be extracted from the multiplexed optical signal 21.

Fourth Embodiment

Figure 7:
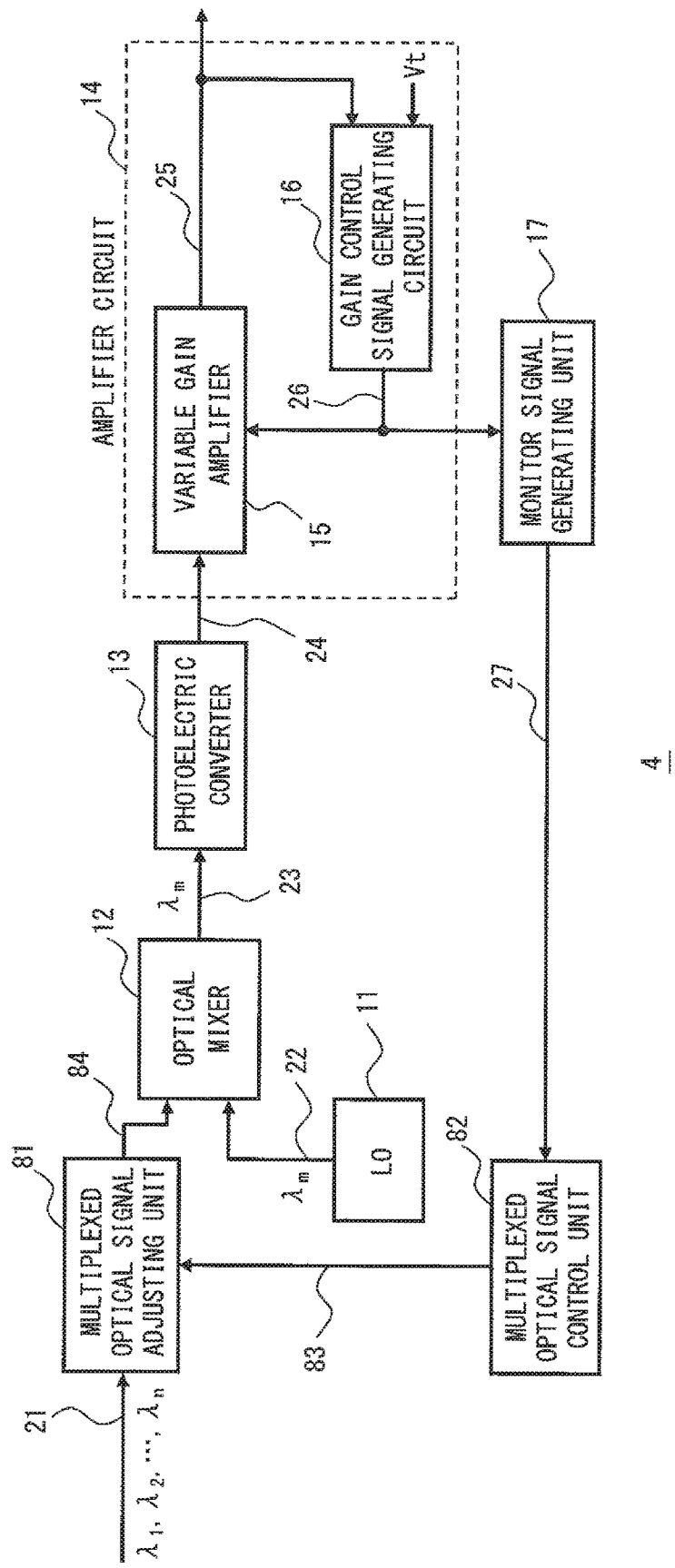
FIG. 7 is a block diagram showing an optical reception apparatus according to a fourth embodiment.

Next, a description will be given of a fourth embodiment of the present invention. FIG. 7 is a block diagram showing an optical reception apparatus according to the fourth embodiment. The optical reception apparatus 4 according to the fourth embodiment is different from the optical reception apparatus 1 described in the first embodiment in that the power of a multiplexed optical signal 84 supplied to the optical mixer 12 is adjusted in accordance with the monitor signal 27 generated by the monitor signal generating unit 17. Other configuration is similar to that of the optical reception apparatus 1 described in the first embodiment, and therefore identical constituent elements are denoted by identical reference numerals, and repetitive descriptions are omitted.

As shown in FIG. 7, the optical reception apparatus 4 according to the present embodiment includes the local oscillator (LO) 11, a multiplexed optical signal adjusting unit 81, the optical mixer 12, the photoelectric converter 13, the variable gain amplifier 15, the gain control signal generating circuit 16, the monitor signal generating unit 17, and a multiplexed optical signal control unit 82.

The multiplexed optical signal adjusting unit 81 adjusts the power of the multiplexed optical signal 21, and outputs the adjusted multiplexed optical signal 84 to the optical mixer 12. The multiplexed optical signal control unit 82 controls the multiplexed optical signal adjusting unit 81 in accordance with the monitor signal 27. The multiplexed optical signal adjusting unit 81 can be configured, for example, using an attenuator (attenuator) that attenuates the multiplexed optical signal 21 in accordance with a control signal 83 output from the multiplexed optical signal control unit 82.

The optical mixer 12 receives the multiplexed optical signal 84 and the local oscillation light 22, and selects the optical signal 23 corresponding to the wavelength of the local oscillation light 22 from the multiplexed optical signal 84. Then, the optical mixer 12 outputs the selected optical signal 23 to the photoelectric converter 13. At this time, the optical mixer 12 causes the multiplexed optical signal 84 and the local oscillation light 22 to interfere with each other and performs a coherent detection, thereby selectively extracting the optical signal corresponding to the wavelength $\lambda_m$ of the local oscillation light 22 from the multiplexed optical signal 21. Hence, in order to properly extract the optical signal 23 of a particular wavelength from the multiplexed optical signal 84, it is necessary to adjust the power of the multiplexed optical signal 84 input to the optical mixer 12 to a proper value.

Accordingly, with the optical reception apparatus 4 according to the present embodiment, the power of the multiplexed optical signal 84 input to the optical mixer 12 is adjusted in accordance with the monitor signal 27 generated by the monitor signal generating unit 17. The multiplexed optical signal control unit 82 generates the control signal 83 for controlling the multiplexed optical signal adjusting unit 81 in accordance with the monitor signal 27, and outputs the control signal 83 to the multiplexed optical signal adjusting unit 81. The multiplexed optical signal adjusting unit 81 adjusts the power of the multiplexed optical signal 21 in accordance with the control signal 83, and outputs the adjusted multiplexed optical signal 84 to the optical mixer 12.

For example, when the power of the multiplexed optical signal 84 is excessively great, the power of the optical signal 23 output from the optical mixer 12 also becomes great. At this time, since the monitor signal 27 indicates that the power of the optical signal 23 is excessively great, the multiplexed optical signal control unit 82 controls the multiplexed optical signal adjusting unit 81 to reduce the power of the multiplexed optical signal 84 input to the optical mixer 12.

Further, for example when the power of the multiplexed optical signal 84 is excessively small, the power of the optical signal 23 output from the optical mixer 12 also becomes small. At this time, since the monitor signal 27 indicates that the power of the optical signal 23 is excessively small, the multiplexed optical signal control unit 82 controls the multiplexed optical signal adjusting unit 81 to increase the power of the multiplexed optical signal 84 input to the optical mixer 12.

For example, the multiplexed optical signal control unit 82 may control the power of the multiplexed optical signal 84 such that the value of the monitor signal 27 (that is, the power value of the optical signal 23) attains a prescribed value. Here, such a prescribed value can be arbitrarily determined.

In this manner, since the optical reception apparatus 4 according to the present embodiment can control the power of the multiplexed optical signal 84 input to the optical mixer 12 in accordance with the monitor signal 27, the optical signal 23 having prescribed power can be extracted.

Fifth Embodiment

Figure 8:
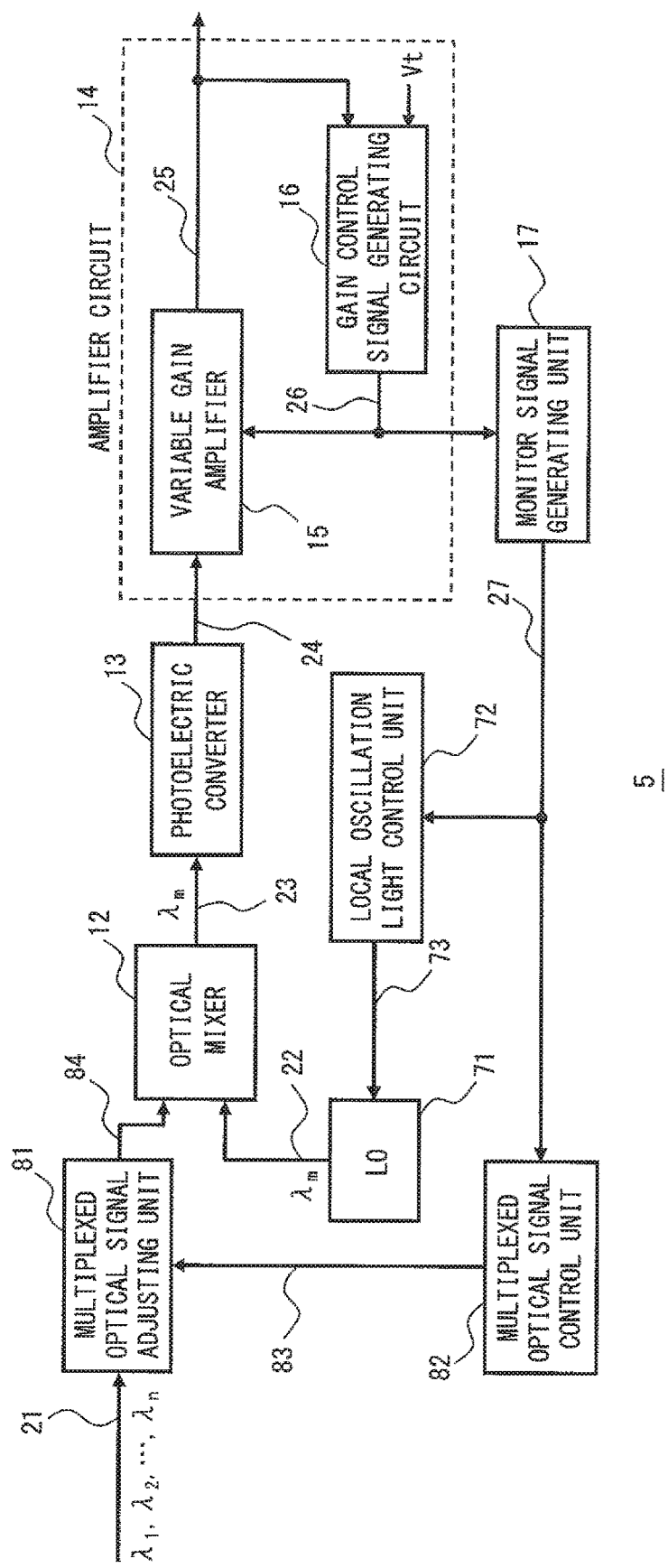
FIG. 8 is a block diagram showing an optical reception apparatus according to a fifth embodiment.

Next, a description will be given of a fifth embodiment of the present invention. FIG. 8 is a block diagram showing an optical reception apparatus according to the fifth embodiment. The optical reception apparatus 5 according to the fifth embodiment has a configuration in which the optical reception apparatus 3 according to the third embodiment and the optical reception apparatus 4 according to the fourth embodiment are combined.

That is, the optical reception apparatus 5 according to the present embodiment controls the power of the local oscillation light 22 in accordance with the monitor signal 27 generated by the monitor signal generating unit 17, and further adjusts the power of the multiplexed optical signal 84 in accordance with the monitor signal 27.

As shown in FIG. 8, the optical reception apparatus 5 according to the present embodiment includes the local oscillator (LO) 71, the optical mixer 12, the photoelectric converter 13, the variable gain amplifier 15, the gain control signal generating circuit 16, the monitor signal generating unit 17, the local oscillation light control unit 72, the multiplexed optical signal adjusting unit 81, and the multiplexed optical signal control unit 82. Note that, these constituent elements are similar to those in the first, third and fourth embodiments, and therefore identical constituent elements are denoted by identical reference numerals, and repetitive descriptions are omitted.

With the optical reception apparatus 5 according to the present embodiment, the power of the local oscillation light 22 can be controlled in accordance with the monitor signal 27. Further, the power of the multiplexed optical signal 84 can be adjusted in accordance with the monitor signal 27. Hence, since the power of the local oscillation light 22 and the power of the multiplexed optical signal 84 can be controlled independently of each other, as compared to the optical reception apparatus according to the third and fourth embodiments, the power of the optical signal 23 output from the optical mixer 12 can be precisely adjusted.

Note that, in the fourth and fifth embodiments, the description has been given of the case where the power of the multiplexed optical signal 84 input to the optical mixer 12 is adjusted using the multiplexed optical signal adjusting unit 81 and the multiplexed optical signal control unit 82. However, the power of the multiplexed optical signal 21 may be adjusted on the transmission apparatus side transmitting the multiplexed optical signal 21. In this case, the monitor signal 27 must be transmitted to the transmission apparatus side.

Further, the invention described in the third to fifth embodiments is also applicable to an optical reception apparatus of the dual polarization quadrature phase shift keying (DP-QPSK) scheme described in the second embodiment.

In the foregoing, though the present invention has been described with reference to the embodiments, the present invention is not limited thereby. Various modifications that can be understood by a person skilled in the art can be made to the configuration or details of the present invention within the scope of the invention.

The present application claims priority based on Japanese Patent Application No. 2013-145238 filed on Jul. 11, 2013, the entire disclosure of which is incorporated herein by reference.

REFERENCE SIGNS LIST 1, 2, 3, 4, 5 OPTICAL RECEPTION APPARATUS
11 LOCAL OSCILLATOR (LO)
12 OPTICAL MIXER
13 PHOTOELECTRIC CONVERTER
14 AMPLIFIER CIRCUIT
15 VARIABLE GAIN AMPLIFIER
16 GAIN CONTROL SIGNAL GENERATING CIRCUIT
17 MONITOR SIGNAL GENERATING UNIT
18 TRANSIMPEDANCE AMPLIFIER
21 MULTIPLEXED OPTICAL SIGNAL
22 LOCAL OSCILLATION LIGHT
23 OPTICAL SIGNAL
24 ELECTRIC SIGNAL
25 OUTPUT SIGNAL
26 GAIN CONTROL SIGNAL
27 MONITOR SIGNAL
31 LOCAL OSCILLATOR (LO)
32 POLARIZATION BEAM SPLITTER
34_1, 34_2 90-DEGREE OPTICAL HYBRID CIRCUIT
35 PHOTOELECTRIC CONVERTER
36_1 to 36_4 AMPLIFIER CIRCUIT
37_1 to 37_4 MONITOR SIGNAL GENERATING UNIT
38_1 to 38_4 ANALOG-DIGITAL CONVERTER CIRCUIT
39 DIGITAL SIGNAL PROCESSING CIRCUIT
61_1 to 61_3, 62_1 to 62_3 OPTICAL COUPLER
63 π/2 PHASE SHIFTER
64_1, 64_2 π PHASE SHIFTER
65_1 to 65_4 OPTICAL MIXER
71 LOCAL OSCILLATOR (LO)
81 LOCAL OSCILLATION LIGHT CONTROL UNIT
81 MULTIPLEXED OPTICAL SIGNAL ADJUSTING UNIT
82 MULTIPLEXED OPTICAL SIGNAL CONTROL UNIT

The invention claimed is:

1. An optical receiver comprising:
   a local oscillator configured to output a local oscillation light;
   a variable optical attenuator configured to attenuate power of an input optical signal;
   an optical hybrid configured to receive the attenuated input optical signal including a wavelength of the local oscillation light by interfering with the local oscillation light;
   a photo detector configured to convert the received optical signal to an electrical signal;
   an amplifier circuit configured to amplify the electrical signal with a gain adjustment value; and
   a controller configured to output, to the amplifier, a gain adjustment signal corresponding to the gain adjustment value,
   wherein when an amplitude of the gain adjustment signal decreases, the variable optical attenuator increases attenuation of the power of the input optical signal.

2. The optical receiver according to claim 1, wherein the amplifier circuit has an automatic gain control.

3. The optical receiver according to claim 2, wherein the variable optical attenuator increases or decreases attenuation of the input optical signal by the automatic gain control.

4. The optical receiver according to claim 2, wherein the automatic gain control includes a target value for amplitude of the amplified electrical signal.

5. The optical receiver according to claim 1, wherein the amplifier circuit includes a transimpedance amplifier.

6. The optical receiver according to claim 1, further comprising:
   an analog-digital converter configured to convert the amplified electrical signal to a digital signal; and
   a digital signal processor configured to process the digital signal.

7. The optical receiver according to claim 1, wherein the variable optical attenuator attenuates the power of the input optical signal depending on a reference value for calibration of the gain adjustment value.

8. The optical receiver according to claim 1, wherein the local oscillator adjusts power of the local oscillation light depending on the gain adjustment value.

9. The optical receiver according to claim 1, wherein the variable optical attenuator attenuates a wavelength multiplexed optical signal, the wavelength multiplexed optical signal includes the input optical signal.

10. A optical communication method comprising:
    outputting a local oscillation light;
    attenuating power of an input optical signal;
    receiving the attenuated input optical signal including a wavelength of the local oscillation light by interfering with the local oscillation light;
    converting the received optical signal to an electrical signal;
    amplifying the electrical signal with a gain adjustment value;
    generating a gain adjustment signal corresponding to the gain adjustment value; and
    when an amplitude of the gain adjustment signal decreases, increasing attenuation of the power of the input optical signal.

11. The optical communication method according to claim 10, further comprising of adjusting amplification of the electrical signal by an automatic gain control.

12. The optical communication method according to claim 11, further comprising of increasing or decreasing attenuation of the input optical signal by the auto gain control.

13. The optical communication method according to claim 11, wherein the automatic gain control includes a target value for amplitude of the amplified electrical signal.

14. The optical communication method according to claim 10, further comprising:
    converting the amplified electrical signal to a digital signal; and
    processing the digital signal.

15. The optical communication method according to claim 10, further comprising of attenuating the power of the input optical signal depending on a reference value for calibration of the gain adjustment value.

16. The optical communication method according to claim 10, further comprising of adjusting power of the local oscillation light depending on the gain adjustment value.

17. The optical communication method according to claim 10, further comprising of attenuating a wavelength multiplexed optical signal, wherein the wavelength multiplexed optical signal includes the input optical signal.

* * * * *